United States Patent
Xing

(10) Patent No.: US 12,119,888 B2
(45) Date of Patent: Oct. 15, 2024

(54) TERMINAL CALIBRATION METHOD, APPARATUS, DEVICE, AND STORAGE MEDIUM

(71) Applicant: GUANGDONG OPPO MOBILE TELECOMMUNICATIONS CORP., LTD., Dongguan (CN)

(72) Inventor: Jinqiang Xing, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 49 days.

(21) Appl. No.: 18/085,565

(22) Filed: Dec. 20, 2022

(65) Prior Publication Data

US 2023/0198637 A1   Jun. 22, 2023

Related U.S. Application Data

(63) Continuation of application No. PCT/CN2020/122969, filed on Oct. 22, 2020.

(51) Int. Cl.
*H04B 17/11* (2015.01)
*H04B 1/04* (2006.01)

(52) U.S. Cl.
CPC .............. *H04B 17/11* (2015.01); *H04B 1/04* (2013.01); *H04B 2001/0408* (2013.01)

(58) Field of Classification Search
CPC .. H04B 17/11; H04B 1/04; H04B 2001/0408; H04B 17/0082; H04B 17/13
USPC .............. 375/219–220, 260, 262, 371
See application file for complete search history.

(56) References Cited

U.S. PATENT DOCUMENTS

| | | | |
|---|---|---|---|
| 10,873,403 B2* | 12/2020 | Chakraborty | H04B 15/00 |
| 2014/0094125 A1* | 4/2014 | Behravan | H04W 24/00 455/63.1 |
| 2015/0055496 A1* | 2/2015 | Zhao | H04W 72/21 370/252 |
| 2018/0102827 A1* | 4/2018 | Noh | H04W 72/51 |
| 2018/0167856 A1* | 6/2018 | Li | H04W 36/324 |
| 2018/0279311 A1* | 9/2018 | Yoo | H04W 8/245 |
| 2019/0059078 A1* | 2/2019 | Noh | H04W 28/20 |
| 2021/0135770 A1* | 5/2021 | Schober | H04L 5/003 |

FOREIGN PATENT DOCUMENTS

| | | |
|---|---|---|
| CN | 102237908 B | 12/2014 |
| CN | 111417202 A | 7/2020 |
| WO | 2019157702 A1 | 8/2019 |

(Continued)

OTHER PUBLICATIONS

Extended European Search Report issued in corresponding European application No. 20958230.3, mailed Oct. 30, 2023.

(Continued)

*Primary Examiner* — Emmanuel Bayard
(74) *Attorney, Agent, or Firm* — BAYES PLLC

(57) ABSTRACT

Embodiments of the present application provide a terminal calibration method, apparatus, device, and storage medium. The method includes: sending to a network device calibration capability information of a terminal device; receiving calibration configuration information which is determined by the network device based on the calibration capability information; and performing a calibration procedure according to the calibration configuration information.

17 Claims, 8 Drawing Sheets

(56) References Cited

FOREIGN PATENT DOCUMENTS

| WO | WO-2019214984 A1 | * | 11/2019 | ............. | H04B 17/12 |
| WO | WO-2020134015 A1 | * | 7/2020 | ......... | G01C 21/3407 |

OTHER PUBLICATIONS

Title: Calibration gap configuration; Source: Qualcomm Incorporated 3GPP TSG-RAN WG4 Meeting #87 R4-1807881 Busan, KR, May 21-25, 2018.
Source: Huawei, HiSilicon; Title: On calibration gap for FR2 3GPP TSG-RAN WG4 Meeting #87 R4-1807422 Busan, Korea, May 21-25, 2018.
International Search Report issued in International application No. PCT/CN2020/122969, mailed Jul. 5, 2021, 4 pages.
Written Opinion of the International Searching Authority issued in International application No. PCT/CN2020/122969, mailed Jul. 5, 2021, 9 pages.
3GPP TSG RAN Meeting #89 RP-202107, Electronic Meeting, Sep. 14-18, 2020, "New WID on NR RF Enhancements for FR2", Agenda Item: 9.1.2, Source: Nokia, Nokia Shanghai Bell, 4 pages.
3GPP TSG-RAN WG4 Meeting #87 R4-1806329, Busan, South Korea, May 21-25, 2018, "On PA calibration gap", Source: Intel Corporation, Agenda item: 7.5.8.9, 3 pages.

* cited by examiner

TERMINAL CALIBRATION METHOD, APPARATUS, DEVICE, AND STORAGE MEDIUM

CROSS-REFERENCE TO RELATED APPLICATION

This application is a continuation of International Application No. PCT/CN2020/122969, filed Oct. 22, 2020, the entire contents of which are incorporated herein by reference.

TECHNICAL FIELD

Embodiments of the present disclosure relate to the communication technical field, and more specifically, to a terminal calibration method, apparatus, and device and a storage medium.

BACKGROUND

With the rapid developments of Internet technologies, terminal devices have become an essential part of people's daily life. The performance of terminal devices is affected by internal devices of the terminal devices. For example, a Power Amplifier (PA) is a main device for signal amplification in a terminal, and the nonlinearity of the PA will lower a demodulation performance of the terminal and may cause interference to other terminals. Thus, how to calibrate a terminal is the key to improve the terminal performance.

In related art, for the calibration of a terminal, for example, the nonlinearity calibration of a PA in the terminal, the output power of the PA may be detected in real time by a pre-distortion method and a power deviation may be compensated, so that the compensated output signal is linearly amplified. Specifically, a pre-distortion gain function of the PA is determined in the production design stage of the terminal and is written into a terminal memory unit, and in actual applications, the terminal can directly call the pre-distortion gain function. In this way, the linearity of the PA may be improved and the output power of the PA may be increased.

However, for a millimeter wave terminal, the pre-distortion gain function of PA will change greatly with external thermal noise, phase noise, interference signal, temperature, etc., when the PA works in a high frequency band, resulting in that the pre-distortion gain function pre-written into the terminal cannot solve the problem of PA nonlinearity, and there is(are) problem(s) with the terminal, such as poor transmit signal quality, poor reception performance and interference with other terminals.

SUMMARY

Embodiments of the present disclosure provide a terminal calibration method, apparatus, and device and a storage medium, which can solve problem(s) with the existing calibration method, such as poor transmit signal quality of a terminal, poor reception performance and interference with other terminals.

According to a first aspect, an embodiment of the present disclosure provides a terminal calibration method. The method is applied to a terminal device. The method includes:
sending to a network device calibration capability information of a terminal device;
receiving calibration configuration information which is determined by the network device based on the calibration capability information; and
performing a calibration procedure according to the calibration configuration information.

According to a second aspect, an embodiment of the present disclosure provides a terminal calibration method. The method is applied to a network device. The method includes:
receiving calibration capability information from a terminal device;
according to the calibration capability information, determining calibration configuration information for the terminal device; and
sending the calibration configuration information to the terminal device.

According to a third aspect, an embodiment of the present disclosure provides a terminal calibration method. The method is applied to a network device. The method includes:
detecting whether a calibration trigger condition is satisfied; and
performing a calibration procedure according to terminal calibration capability information when it is determined that the calibration trigger condition is satisfied.

According to a fourth aspect, an embodiment of the present disclosure provides a device for terminal calibration, including:
a sending module configured to send to a network device calibration capability information of a terminal device;
a receiving module configured to receive calibration configuration information which is determined by the network device based on the calibration capability information; and
a processing module configured to perform a calibration procedure according to the calibration configuration information.

According to a fifth aspect, an embodiment of the present disclosure provides a device for terminal calibration, including:
a receiving module configured to receive calibration capability information from a terminal device;
a processing module configured to, according to the calibration capability information, determine calibration configuration information for the terminal device; and
a sending module configured to send the calibration configuration information to the terminal device.

According to a sixth aspect, an embodiment of the present disclosure provides a device for terminal calibration, including:
a detection module configured to detect whether a calibration trigger condition is satisfied; and
a calibration module configured to perform a calibration procedure according to terminal calibration capability information when it is determined that the calibration trigger condition is satisfied.

According to a seventh aspect, an embodiment of the present disclosure provides a terminal device, including:
a processor, a memory, a transceiver and an interface for communicating with a network device;
wherein the memory stores computer-executable instructions;
wherein the processor executes the computer-executable instructions stored in the memory to cause the processor to perform the terminal calibration method according to the first aspect.

Optionally, the processor may be a chip.

According to an eighth aspect, an embodiment of the present disclosure provides a network device, including:

a processor, a memory, a transceiver and an interface for communicating with a network device;

wherein the memory stores computer-executable instructions;

wherein the processor executes the computer-executable instructions stored in the memory to cause the processor to perform the terminal calibration method according to the second aspect.

Optionally, the processor may be a chip.

According to a ninth aspect, an embodiment of the present disclosure provides a terminal device, including: a processor, and a memory;

wherein the memory stores computer-executable instructions;

wherein the processor executes the computer-executable instructions stored in the memory to cause the processor to perform the terminal calibration method according to the third aspect.

Optionally, in the above specific implementations of the terminal device, the processor may be a chip.

According to a tenth aspect, an embodiment of the present disclosure provides a computer-readable storage medium having computer-executable instructions stored thereon, wherein when the computer-executable instructions are executed by a processor, the processor is caused to perform the terminal calibration method according to the first aspect.

According to an eleventh aspect, an embodiment of the present disclosure provides a computer-readable storage medium having computer-executable instructions stored thereon, wherein when the computer-executable instructions are executed by a processor, the processor is caused to perform the terminal calibration method according to the second aspect.

According to a twelfth aspect, an embodiment of the present disclosure provides a computer-readable storage medium having computer-executable instructions stored thereon, wherein when the computer-executable instructions are executed by a processor, the processor is caused to perform the terminal calibration method according to the third aspect.

According to a thirteenth aspect, an embodiment of the present disclosure provides a program. When the program is executed by a processor, the processor is caused to perform the terminal calibration method according to the first aspect.

According to a fourteenth aspect, an embodiment of the present disclosure provides a program. When the program is executed by a processor, the processor is caused to perform the terminal calibration method according to the second aspect.

According to a fifteenth aspect, an embodiment of the present disclosure provides a program. When the program is executed by a processor, the processor is caused to perform the terminal calibration method according to the third aspect.

According to a sixteenth aspect, an embodiment of the present disclosure provides a computer program product, including program instructions which are configured to implement the terminal calibration method according to the first aspect.

According to a seventh aspect, an embodiment of the present disclosure provides a computer program product, including program instructions which are configured to implement the terminal calibration method according to the second aspect.

According to an eighteenth aspect, an embodiment of the present disclosure provides a computer program product, including program instructions which are configured to implement the terminal calibration method according to the third aspect.

According to a nineteenth aspect, an embodiment of the present disclosure provides a chip, including a processing module and a communication interface. The processing module is capable of implementing the method according to the first aspect.

Further, the chip includes a storage module (e.g., a memory). The storage module is configured to store instructions. The processing module is configured to execute the instructions stored in the storage module, and execution of the instructions stored in the storage module causes the processing module to perform the terminal calibration method according to the first or third aspect.

According to a twentieth aspect, an embodiment of the present disclosure provides a chip, including a processing module and a communication interface. The processing module is capable of implementing the method according to the second aspect.

Further, the chip includes a storage module (e.g., a memory). The storage module is configured to store instructions. The processing module is configured to execute the instructions stored in the storage module, and execution of the instructions stored in the storage module causes the processing module to perform the terminal calibration method according to the second aspect.

In the terminal calibration methods, apparatuses, devices, and storage mediums provided by embodiments of the present disclosure, a terminal device detects whether a calibration trigger condition is satisfied and, upon determining that the calibration trigger condition is satisfied, the terminal device performs a calibration procedure according to terminal calibration capability information. Alternatively, a terminal device may report its supported calibration capability information to a network device. The network device can configure calibration configuration information for the terminal device according to the calibration capability information and send it to the terminal device, causing the terminal device to perform the calibration procedure based on the received calibration configuration information. In the above technical solutions, the terminal device can improve its own performance by performing the calibration procedure, which improves the transmit signal quality, and can thus avoid interference with other users and also improve the reception performance of the terminal device.

DETAILED DESCRIPTION

Figure 1:
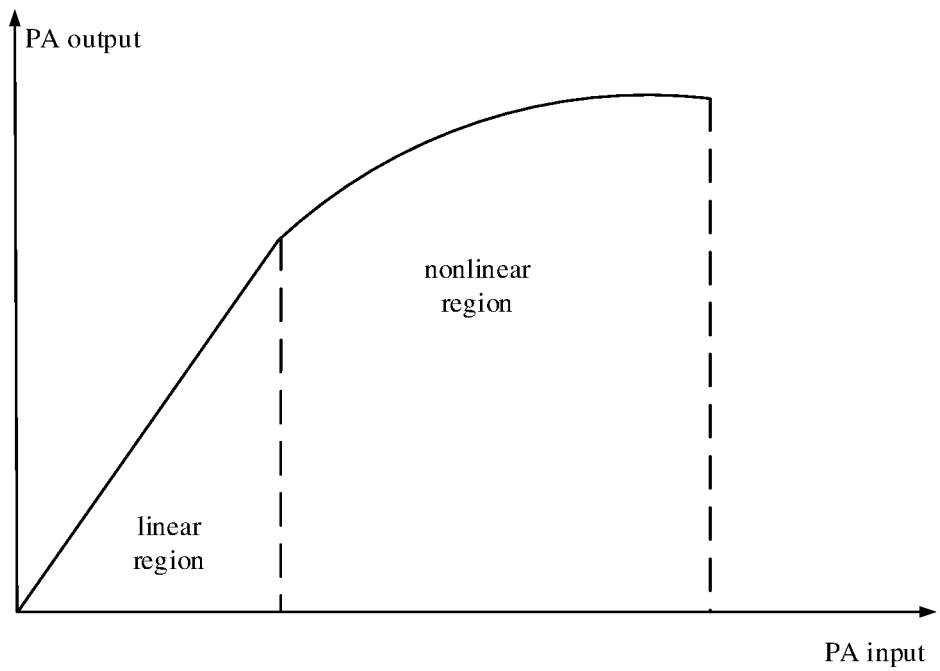
FIG. 1 is a schematic diagram showing a distribution of linear and nonlinear regions of a PA.

In order to make the purpose(s), technical solutions and advantages of the embodiments of the present disclosure clearer, the technical solutions in the embodiments of the present disclosure will be clearly and completely described below in conjunction with the accompanying drawings in the embodiments of the present disclosure. It is clear that the embodiments described are a part of the embodiments of the present disclosure, and not all of them. Based on the embodiments of the present disclosure herein, all other embodiments obtained by a person of ordinary skill in the art without making creative labor fall within the scope of protection of the present disclosure.

The terms "first", "second", etc. in the specification, claims and the above-mentioned drawings of the embodiments of the present disclosure are used to distinguish similar objects and are not necessarily used to describe a particular order or sequence. It should be understood that the numbers so used are interchangeable where appropriate so that the embodiments of the present disclosure described herein can be implemented in an order other than that illustrated or described herein. In addition, the terms "including" and "having", and any variations thereof, are intended to cover non-exclusive inclusion, e.g., a process, method, system, product, or apparatus including a series of steps or units is not necessarily limited to those steps or units that are clearly listed, but may include steps or units that are not clearly listed or that are inherent to the process, method, product, or apparatus.

In recent years, the Internet of Things technologies, communication technologies, artificial intelligence, cloud computing, big data and other technologies closely related to the consumer electronics industry continue to develop and popularize, and 5G technologies gradually go into large-scale popularization and application. The consumer electronics industry ushered in a new period of rapid developments driven by technologies, the market scale continues to expand. Terminal devices can meet the needs of consumers in life and work for communication, information, transaction processing and entertainment, etc. Terminal devices are the product of human technological progress and demand upgrading, and mainly include smart phones, computers, tablets, smart wearable devices, etc.

The performance of a terminal device is a form of indicator of the quality of the device, which can reduce material consumption, improve economic efficiency and enhance market competitiveness. The performance of a terminal device is mainly affected by an internal device of the terminal. For example, a power amplifier (PA) is the main device to amplify signal(s) in the terminal, and its amplification factor and linearity are main indicators. Non-linearity of the PA will lead to distortion of the amplified signal, reduce the demodulation performance of the terminal and interfere with other users. Therefore, the following describes improvement of linearity of a PA to introduce the technical problem(s) to be solved in the present disclosure.

Exemplarily, FIG. 1 is a schematic diagram of a distribution of linear and nonlinear regions of a PA. As shown in FIG. 1, the working region of the PA may include a linear region and a nonlinear region. In practical applications, in order to avoid distortion of an amplified signal, the terminal device usually amplifies a signal in the linear region of the PA. But, the linear region of the PA is usually narrow, and the working efficiency of the PA in the linear region is generally low, which may lead to serious power consumption of the PA. Thus, it is needed to improve the linearity to reduce the power consumption of the PA by extending the linear region of the PA.

Figure 2:
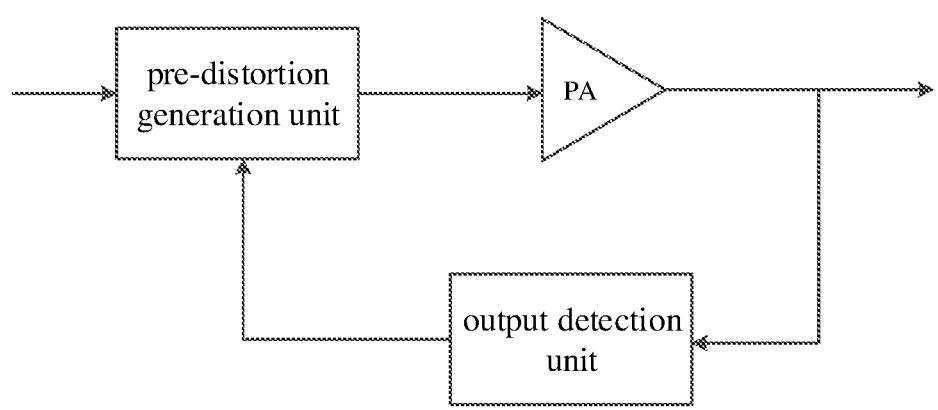
FIG. 2 is a schematic diagram showing the structure of a PA pre-distortion technology.

Currently, a pre-distortion technology is usually used to improve the linearity of a PA. FIG. 2 is a schematic diagram of the structure of a PA pre-distortion technology. As shown in FIG. 2, a pre-distortion generation unit is set in front of the PA, and an output detection unit is added at the back of the PA. The output detection unit is used to obtain the output signal of the PA, and then the output signal is used to control the output of the pre-distortion generation unit.

Optionally, assuming that a gain function of the pre-distortion generation unit is D (f, A) and an actual gain function of the PA is P(f, A), a target gain function of the PA is H (f, A) which may be expressed by the following equation:

$$H(f,A)=D(f,A) \times P(f,A)=\text{constant}$$

In practical applications, since the performance of a low-frequency PA is stable and basically does not change significantly with external factors, the gain function of the pre-distortion generation unit, i.e., the pre-distortion gain function, may generally be obtained through testing in a laboratory at the production design stage of the terminal. The pre-distortion gain function is written into a storage unit of the terminal, and thus the pre-distortion gain function may be directly called in actual use. In this way, the linearity of the PA can be improved, and the output power of the PA can be increased. In practical applications, this processing method is called a static pre-distortion technology.

However, for a millimeter wave terminal, due to the high operating band of the PA in the millimeter wave terminal, the PA target gain function H (f, A) changes significantly with the external thermal noise, phase noise, interference signal, temperature, etc., resulting in the failure of the pre-distortion gain function pre-written into the terminal. Thus, pre-distortion gain function cannot solve the nonlinearity problem of the PA. That is, when the static pre-distortion technology used in the low frequency band is applied to a millimeter wave terminal, the effect is poor. Therefore, it is necessary to study how to dynamically adjust the pre-distortion gain function of the PA to mitigate the influence of the environment on the linearity of the PA.

Figure 3:
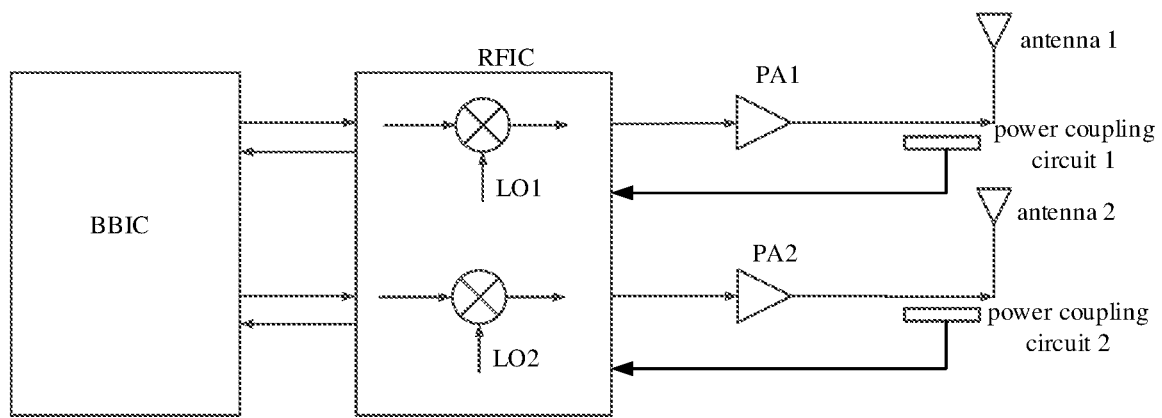
FIG. 3 is a schematic diagram of a radio frequency structure of a low frequency band terminal.

Optionally, in the current pre-distortion technology for improving the linearity of the terminal PA, it is also possible to compensate for the power deviation by real-time detection of the output power of the PA, so as to achieve a linearly amplified output signal after compensation. Specifically, FIG. 3 is a schematic diagram of a radio frequency structure of a low frequency band terminal. As shown in FIG. 3, inside a terminal, a transmit signal of the terminal is amplified by a PA and radiated into the air through an antenna. A power coupling circuit is usually set behind the PA to obtain the actual transmit signal, and then the obtained actual transmit signal is fed back to a Radio Frequency Integrated Circuit (RFIC). The RFIC then transmits the actual transmit signal to a Baseband Integrated Circuit (BBIC). The BBIC demodulates the actual transmit signal to obtain the specific magnitude of the transmit power, and then perform an adjustment according to a target transmit power to achieve precise control of the transmit power.

Exemplarily, in FIG. 3, two PAs (PA1 and PA2), two antennas (antenna 1 and antenna 2) and two power coupling circuits (power coupling circuit 1 and power coupling circuit 2) and a RFIC including two frequency mixers are illustrated as an example. Optionally, each frequency mixer is connected to a Local Oscillator (LO), for example, LO1 and LO2 in FIG. 3. It is understood that the schematic radio frequency structure may also include other numbers of PAs, antennas, and power coupling circuits, and embodiments of the present disclosure do not limit the number of individual devices.

Optionally, the number of frequency mixers included in the RFIC may be consistent with the number of data streams transmitted by the terminal device, which is consistent with the grouping of an antenna array corresponding to each data stream.

Figure 4:
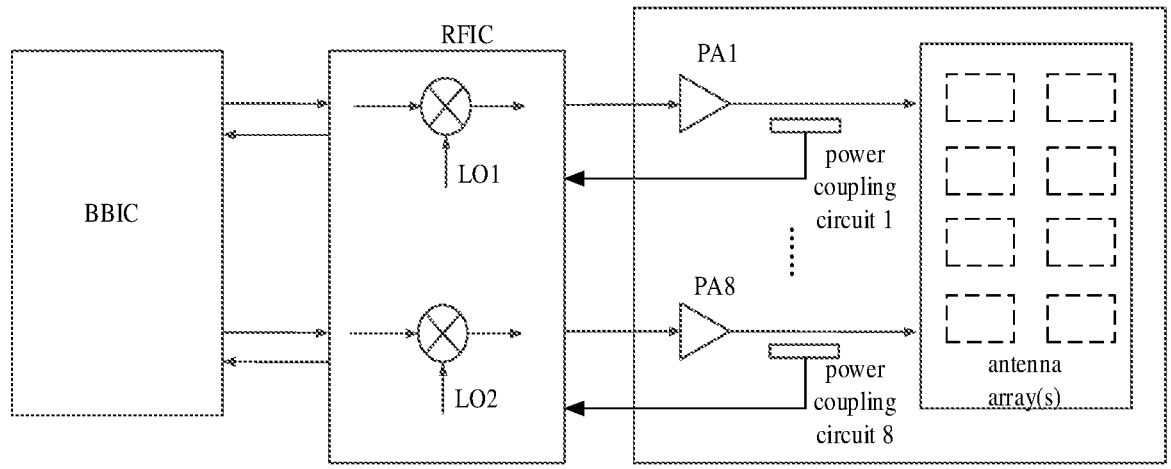
FIG. 4 is a schematic diagram of a radio frequency structure of a millimeter wave terminal.

It is worth noting that the above radio frequency structure is more often used in a low frequency band where independent PAs and antennas are used. However, for a millimeter wave terminal, the terminal mostly adopts integrated radio frequency and antenna designs. For example, FIG. 4 is a schematic diagram of a radio frequency structure for a millimeter wave terminal. As shown in FIG. 4, the radio frequency structure is illustrated with 8 antenna arrays and 8 PAs inside the terminal. That is, multiple antennas are usually arranged in a millimeter wave terminal.

In practice applications, due to the large number of antennas in the millimeter wave terminal and the limitation of chip size, it is difficult to set a power feedback circuit for each PA. That is, it is difficult to have enough feedback circuits inside the terminal to achieve real-time power compensation and control. Therefore, for the control of transmit power, the millimeter wave band can only be based on the above static pre-distortion technology, but the change of external temperature will lead to static calibration parameters deviation from actual situations, and the transmit signals of the terminal still have distortion. This will also reduce the quality of the transmit signals, interfere with other users, and cause the reception performance of the terminal device to deteriorate.

In view of the above technical problem, the technical ideas of the present disclosure are as follows. In practical applications, a terminal may adopt real-time calibration to improve its performance. That is, the terminal may carry out a calibration activity at a certain time in an actual network, while normal signal transmission and reception are carried out at other times. Therefore, in one scenario, a terminal device may detect the current scenario where it is in and start a calibration procedure when it determines that a calibration condition is satisfied. In another scenario, a terminal device may perform the calibration procedure under the control of a network device by interacting with the network device (base station). This is because the fact that in existing networks, the activity of the terminal transmit signals usually needs to follow the scheduling of the base station to avoid interference among users in a cell, and thus, the terminal calibration also needs to be under the control of the base station.

In view of the above technical ideas, an embodiment of the present disclosure provides a terminal calibration method. One possible design is that the terminal device detects on its own whether a calibration trigger condition is satisfied, and performs a calibration procedure according to terminal calibration capability information when the calibration trigger condition is determined to be satisfied. Another possible design is that a terminal device may report its own supported calibration capability information to a network device, such that the network device can configure calibration configuration information for the terminal device based on this calibration capability information and send the calibration configuration information to the terminal device. The terminal device performs the calibration procedure based on the received calibration configuration information. In both possible designs, the terminal device can improve its own performance by performing the calibration procedure, and can improve the quality of a transmit signal. Accordingly, both possible designs can avoid interference with other users and improve the reception performance of the terminal device.

Figure 5:
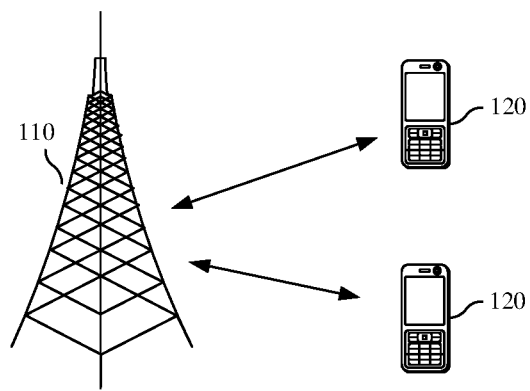
FIG. 5 is a schematic diagram of a structure of a communication system according to an embodiment of the present disclosure.

Optionally, before presenting the technical solutions of the present disclosure, the following describes a communication system to which the technical solutions according to embodiments of the present disclosure may be applied. Exemplarily, FIG. 5 is a schematic diagram of a structure of a communication system according to an embodiment of the present disclosure. As shown in FIG. 5, the communication system may include a network device 110 and a plurality of terminal devices 120 within the coverage area of the network device 110. FIG. 5 is explained by illustrating one network device 110 and two terminal devices 120.

Optionally, the communication system may include a plurality of network devices 110, and each network device may include other numbers of terminal devices 120 within the coverage area of each network device, and the embodiments of the present disclosure do not limit the number of network devices 110 and terminal devices 120 included in the communication system.

As shown in FIG. 5, the terminal devices 120 and the network device 110 may be connected wirelessly. For example, the network device 110 and the plurality of terminal devices 120 perform wireless communication using an unlicensed spectrum. Optionally, the terminal devices 120 may communicate with each other by device to device (D2D) communication.

It is understood that FIG. 5 is only a schematic diagram of the communication system, and the communication system may also include other network devices, for example, a core network device, a wireless relay device and a wireless backhaul device, or may include other network entities such as a network controller, a mobile management entity, etc. Embodiments of the present disclosure are not limited thereto.

The technical solutions according to embodiments of the present disclosure may be applied in various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Advanced Long Term Evolution (LTE-A) system, New Radio (NR) system, evolutionary system of NR system, LTE-based access to unlicensed spectrum (LTE-U) system, NR-based access to unlicened spectrum (NR-U) system, Universal Mobile Telecommunication System (UMTS), Worldwide interoperability for Microwave Access (WiMAX) communication system, Wireless Local Area Network (WLAN), Wireless Fidelity (WiFi), next generation communication system, or other communication systems.

Generally speaking, traditional communication systems support a limited number of connections and are easy to implement. However, with the development of communication technologies, mobile communication systems will not only support traditional communications, but also support, for example, Device-to-Device (D2D) communication, Machine-to-Machine (M2M) communication, Machine-Type Communication (MTC), and Vehicle-to-Vehicle (V2V) communication, etc. Embodiments of the present disclosure may also be applied to these communication systems.

The system architectures and service scenarios described in embodiments of the present disclosure are intended to illustrate the technical solutions of embodiments of the present disclosure more clearly, and do not constitute a limitation of the technical solutions provided by embodiments of the present disclosure. It is known to a person of ordinary skill in the art that the technical solutions provided by embodiments of the present disclosure are equally applicable to similar technical problems as the network architecture evolves and new service scenarios emerge.

The network device involved in embodiments of the present disclosure may be an ordinary base station (such as NodeB or eNB or gNB), a new radio controller (NR controller), a centralized unit, a new radio base station, a radio remote module, a micro base station, a relay, a distributed unit, a transmission reception point (TRP), a transmission point (TP), or any other device. The embodiments of present disclosure do not limit the specific technology and specific device form used in the network device. For the convenience of description, in all embodiments of the present disclosure, the above devices providing wireless communication functions for terminal devices are collectively referred to as network devices.

In embodiments of the present disclosure, a terminal device may be any terminal. For example, the terminal device may be a user device for machine-type communication. That is, the terminal device may also be called a user equipment (UE), a mobile station (MS), a mobile terminal, a terminal, etc. The terminal device may communicate with one or more core networks via a Radio Access Network (RAN). For example, the terminal device may be a mobile phone (or called "cellular" phone), a computer with a mobile terminal, etc. For example, the terminal device may also be a portable, pocket-sized, handheld, computer-integrated or vehicle-mounted mobile device that exchanges language and/or data with the radio access network. No specific limitations are made in embodiments of the present disclosure.

Optionally, the network devices and terminal devices may be deployed on land, including indoor or outdoor, handheld or vehicle-mounted; or the network devices and terminal devices may be deployed on water; or, the network devices and terminal devices may be deployed on aircraft, balloons, and artificial satellites in the air. The embodiments of present disclosure do not limit the application scenarios of the network device(s) and terminal devices.

Optionally, the communication between the network device and the terminal devices and between the terminal devices may be carried out via a licensed spectrum, or via an unlicensed spectrum, or via both the licensed spectrum and the unlicensed spectrum simultaneously. Embodiments of the present disclosure do not limit the spectrum used for communications between the network device and the terminal devices.

In the following, the technical solutions of the present disclosure will be described in detail by example embodiments. It should be noted that the technical solutions of the present disclosure may include some or all of the following contents, and these example embodiments below may be combined with each other, and the same or similar concepts or processes may not be repeated in some embodiments.

Figure 6:
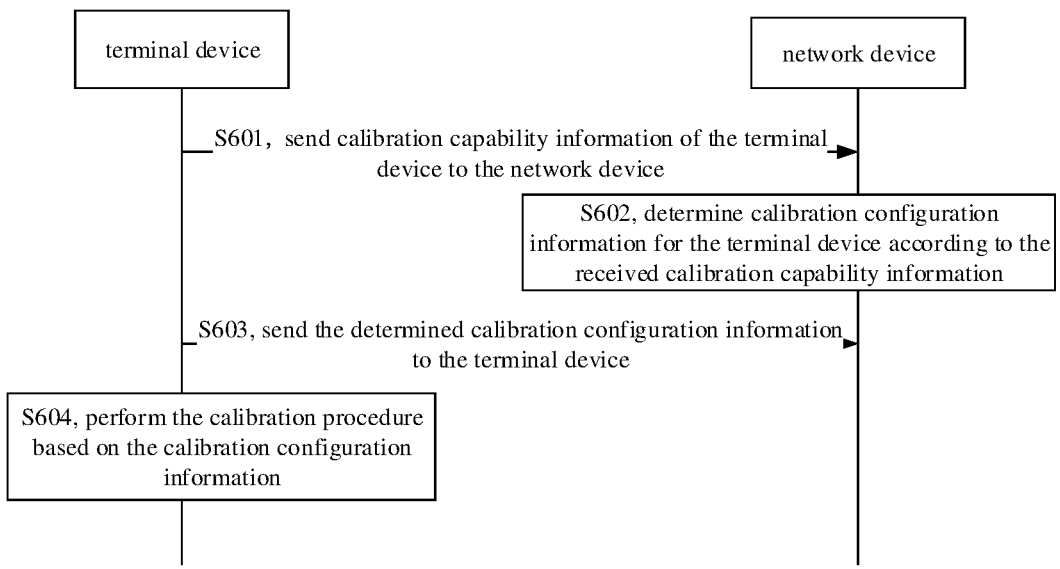
FIG. 6 is a schematic diagram showing interactions in a terminal calibration method according to a first embodiment of the present disclosure.

FIG. 6 is a schematic diagram showing interactions in a terminal calibration method according to a first embodiment of the present disclosure. The method is illustrated with the information interactions between a terminal device and a network device. Referring to FIG. 6, in the embodiment, the method may include the following steps.

In S601, the terminal device sends calibration capability information of the terminal device to the network device.

In practical applications, for a terminal device with real-time self-calibration capability, the terminal device may send calibration capability information to a network device serving the terminal device when the terminal device is started and connected to the network, so as to notify the network device that the terminal device needs to perform self-calibration to improve performance during use.

Exemplarily, the calibration capability information includes at least one of the following:

(1) The type of a calibration time window supported by the terminal device.

In the embodiment, the calibration time window refers to information of a time window in which the terminal device performs the calibration procedure. The types of calibration time windows supported by the terminal device may be divided into two categories according to operations performed by the terminal device on different transmit links within the calibration time window, namely: a calibration time window in which all of at least one transmit link is used for calibration; and a calibration time window in which a part of the at least one transmit link is used for calibration.

Figure 7A:
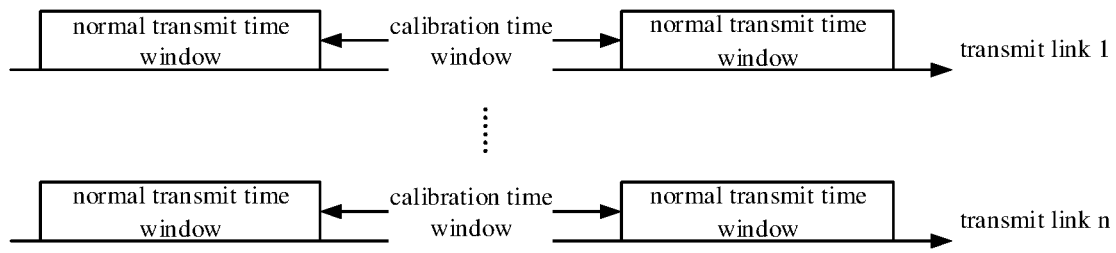
FIG. 7A is a schematic diagram of a distribution of calibration time windows over transmit links.

As an example, FIG. 7A is a schematic diagram of a distribution of calibration time windows over transmit links. As shown in FIG. 7A, it is assumed that the terminal device has n transmit links, where N is an integer greater than or equal to 1. A calibration time window in which all of at least one transmit link is used for calibration means that in the calibration time window, the terminal device does not perform uplink useful data transmission and only performs a self-calibration activity (performs the calibration procedure), and the terminal device only performs uplink useful information transmission during the normal transmit time windows.

Figure 7B:
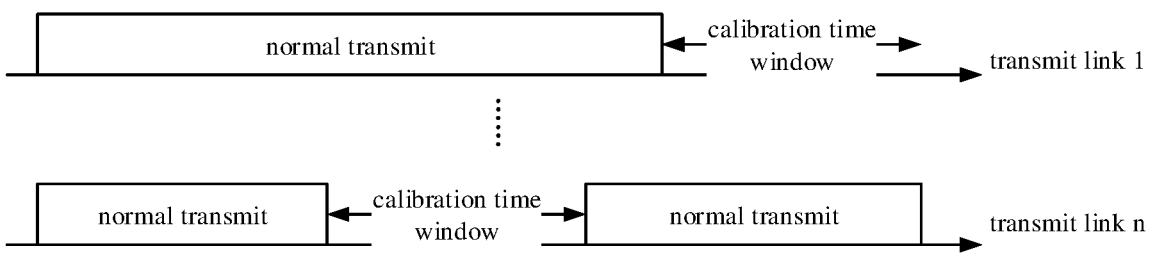
FIG. 7B is a schematic diagram of another distribution of calibration time windows over transmit links.

As another example, FIG. 7B is a schematic diagram of another distribution of calibration time windows over transmit links. As shown in FIG. 7B, it is assumed that the terminal device has n transmit links, where N is an integer greater than or equal to 1. A calibration time window in which a part of the at least one transmit link is used for calibration means that in the calibration time window, a part of the at least one transmit link of the terminal device performs sending of uplink useful data, while another part of the at least one transmit link performs the calibration procedure.

(2) Information of at least one terminal performance indicator that the terminal device is capable of adjusting after calibration.

Exemplarily, the information of at least one terminal performance indicator may be the magnitude of the transmit power that the terminal device is able to increase by performing calibration, for example, 2 dB, 4 dB, etc. Or, the information of at least one terminal performance indicator may be the magnitude of useless radiated power, the magnitude of useless power consumption, and so on that the terminal device is able to reduce by performing calibration. Embodiments of the present disclosure do not limit the specific form of the information of at least one terminal performance indicator, which may be determined according to an actual scenario.

In an embodiment, the terminal device can adjust the performance indicators such as the magnitude of the transmit power, the magnitude of the useless radiated power or the magnitude of the useless power consumption of the terminal device by performing the calibration procedure. Thus, the purpose of improving the performance of the terminal device can be achieved. That is, the terminal device may report to the network device the information of at least one terminal performance indicator such as the transmit power that can be improved during its calibration procedure or after calibration.

(3) The calibration type supported by the terminal device.

Optionally, the terminal device may classify the types of calibration supported by the terminal device into a periodic calibration and a non-periodic calibration according to whether the terminal device can perform the periodic calibration procedure. That is, the terminal device supports: the periodic calibration; or, the non-periodic calibration; or both the periodic calibration and the non-periodic calibration.

Optionally, the periodic calibration means that the terminal device supports periodic configuration information in a calibration time window and completes calibration in a corresponding calibration time window. Specifically, the terminal device supports the network device to configure a fixed time period in the calibration time window as a calibration time period and may perform the calibration procedure in that calibration time period.

It is understood that embodiments of the present disclosure do not limit the specific start position and length of the calibration time period in the calibration time window, which may be determined according to an actual scenario.

Optionally, the non-periodic calibration may include an event-triggered calibration, which means that the terminal device is triggered to initiate the calibration procedure when a certain condition is met. Exemplarily, the certain condition may be the magnitude of the transmit power, or the bandwidth of the transmit power, or a modulation and demodulation condition(s), etc., which are not limited by the embodiments of the present disclosure.

In S602, the network device determines calibration configuration information for the terminal device according to the received calibration capability information.

Optionally, the calibration configuration information includes at least one of the following: calibration slot information, calibration trigger information. The calibration slot information includes at least one of the following: the length, the period and the start position of the calibration time window (in other words, the calibration slot information includes the length, and/or the period, and/or the start position of the calibration time window). The calibration trigger information includes at least one of the following: a periodic trigger condition, and a non-periodic trigger condition (in other words, the calibration trigger information includes a aperiodic trigger condition, and/or a non-periodic trigger condition).

In practical applications, when the network device receives from the terminal device the calibration capability information supported by the terminal device, the network device may configure a corresponding time window for the terminal device according to the type of calibration time window and the calibration type supported by the terminal device, i.e., the network device determines the calibration slot information for the terminal device.

Exemplarily, the calibration slot information may include at least one of the information such as the length, period, and/or start position of the calibration time window.

The unit of the length of the calibration time window may be any one of time units such as a symbol, a slot, a subframe, a frame, a millisecond or a second.

The unit of the period of the calibration time window may be any one of a symbol, a slot, a subframe, a frame, a millisecond, or a second. It is understood that the period of the calibration time window is only applicable to a terminal device that supports the periodic calibration.

The start position of the calibration time window may be a predefined default start position, e.g., the first available uplink transmit slot after receiving the slot configuration information, etc. Or, the start position of the calibration time window may be an indicated start position, e.g., a start position indicated by the network device via Radio Resource Control (RRC) or Downlink Control Information (DCI), and so on.

Figure 8:
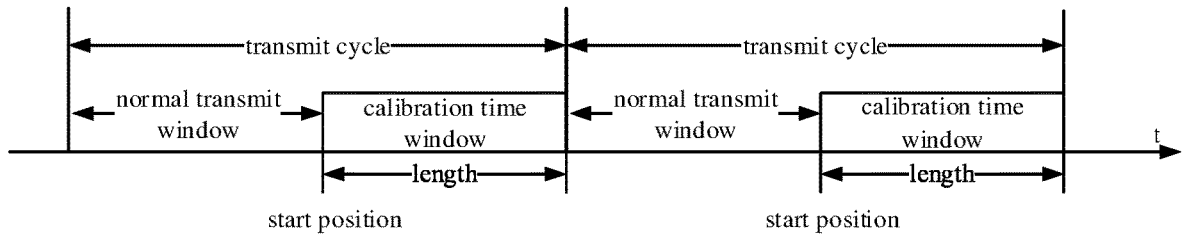
FIG. 8 is a schematic diagram of a distribution of calibration slot information on a transmit link.

Exemplarily, FIG. 8 is a schematic diagram of a distribution of calibration slot information on a transmit link. As shown in FIG. 8, the calibration time window is at a fixed time period in each transmit cycle and the start position is fixed and the length is the same. FIG. 8 is illustrated with slot configuration information in two transmit cycles.

It can be understood that the embodiments of the present disclosure do not limit the specific information of the length, period and start position of the calibration time window in the slot configuration information, which may be determined according to an actual scenario and will not be repeated here.

Optionally, after the network device completes the corresponding calibration time window configuration based on the received calibration capability information of the terminal device to obtain the calibration slot information, the network device may further configure calibration trigger information for the terminal device, i.e., the trigger information for the calibration procedure.

In embodiments of the present disclosure, the calibration trigger information includes: a periodic trigger condition; or a non-periodic trigger condition; or both the periodic trigger condition and the non-periodic trigger condition.

The periodic trigger condition includes any one of the following that:
  a calibration prohibition timer configured by the network device expires and a calibration period configured by the network device is reached; or
  the network device does not configure the calibration prohibition timer and the calibration period configured by the network device is reached.

As an example, if the network device configures a calibration prohibition timer (Prohibit Timer) for the calibration procedure of the terminal device, the periodic trigger condition needs to satisfy both of the following two conditions: first, the terminal device satisfies the calibration slot information configured by the network device, i.e., the period of the configured calibration time window is reached, and the calibration prohibition timer expires.

As another example, if the network device does not configure a calibration prohibition timer (Prohibit Timer) for the calibration procedure of the terminal device, the periodic trigger condition is that the terminal device can be triggered to perform the calibration procedure when the terminal device satisfies the calibration slot information configured by the network device, i.e., the period of the configured calibration time window is reached.

Optionally, the non-periodic trigger condition includes any one of the following that:
  a calibration prohibition timer configured by the network device expires and transmit information of the terminal device satisfies a first condition; or
  the network device does not configure the calibration prohibition timer and the transmit information of the terminal device satisfies the first condition.

As an example, if the network device configures a calibration prohibition timer (Prohibit Timer) for the calibration procedure of the terminal device, the non-periodic trigger condition requires that both of the following two conditions are satisfied: first, the transmit information of the terminal device satisfies the first condition; and, the Prohibit Timer expires.

As an example, if the network device does not configure a calibration prohibition timer (Prohibit Timer) for the calibration procedure of the terminal device, the non-periodic trigger condition is that: the calibration procedure of the terminal device can be triggered when the transmit information of the terminal device satisfies the first condition.

The above first condition includes at least one of the following (i.e., A1 and/or A2 and/or A3 and/or A4 and/or A5).

A1. An amount of change in a transmit power of the terminal device between a current transmit moment and a previous transmit moment is greater than a power change threshold.

Optionally, the amount of change in the transmit power is the amount of increase or decrease in the transmit power of the terminal device at the current moment compared to the previous moment. The power change threshold may be 10 dB.

Specifically, when the amount of increase or decrease in the transmit power of the terminal device or the transmit power for the terminal device as scheduled by the network device at the current moment compared to the previous moment is greater than the power change threshold, it is determined that the first condition is satisfied.

A2. The transmit power of the terminal device is greater a power threshold.

Optionally, the power threshold is, for example, 18 dBm. That is, the first condition is satisfied when the transmit power of the terminal device scheduled by the network device is greater than 18 dBm.

A3. An amount of change in a transmit bandwidth of the terminal device between the current transmit moment and the previous transmit moment is greater than a bandwidth change threshold.

Optionally, the amount of change in the transmit bandwidth is the amount of increase or decrease in the transmit bandwidth of the terminal device at the current moment compared to the previous moment. The transmit bandwidth change threshold may be 100 MHz.

Accordingly, the A3 condition may specifically be that: the amount of increase or decrease in the transmit bandwidth of the terminal device scheduled by the network device at the current moment compared to a transmit bandwidth at a previous moment exceeds the bandwidth change threshold.

A4. The transmit bandwidth of the terminal device is greater than a bandwidth threshold.

Optionally, the bandwidth threshold may be 200 MHz. Here, it is determined that the first condition is satisfied when the transmit bandwidth of the terminal device scheduled by the network device exceeds the bandwidth threshold.

A5. A used modulation method satisfies a preset modulation condition.

Optionally, the preset modulation condition may be a modulation level higher than quadrature phase shift keying (QPSK), i.e., the first condition is determined to be satisfied when the modulation level of the modulation method used by the terminal device or scheduled by the network device is higher than QPSK.

It is understood that in each of the above conditions, the power change threshold, power threshold, bandwidth change threshold, bandwidth threshold, etc. may be a threshold value pre-configured by the network device or a threshold value determined independently by the terminal device, and embodiments of the present disclosure do not limit them.

In S603, the network device sends the determined calibration configuration information to the terminal device.

In this step, when the network device determines the calibration configuration information based on the received calibration capability information, the calibration configuration information may be sent to the terminal device in order to accurately control the calibration situation of the terminal device, so that the terminal device performs the calibration procedure based on the calibration configuration information.

In S604, the terminal device performs the calibration procedure based on the calibration configuration information.

Exemplarily, after receiving the calibration configuration information from the network device, the terminal device may determine the timing of calibration based on the calibration configuration information and perform the calibration procedure when it is determined to be able to calibrate.

Optionally, when the calibration configuration information includes the calibration slot information and the calibration trigger information, the S604 may be interpreted as: first, determining that the calibration trigger condition is met according to the calibration trigger information, and then performing the calibration procedure according to the calibration slot information.

Specifically, after receiving the calibration configuration information, the terminal device first determines a specific trigger condition configured by the network device, for example, a periodic trigger condition or a non-periodic trigger condition, based on the calibration trigger information. Then, the terminal device determines whether the calibration trigger condition is satisfied based on the specific trigger condition configured.

For example, when the periodic trigger condition is configured, if the network device does not configure a calibration prohibition timer for the terminal device, the terminal device determines whether the calibration trigger condition is satisfied based on whether the period of the calibration time window is reached. If the network device configures a calibration prohibition timer for the terminal device, the terminal device determines whether the calibration trigger condition is satisfied based on whether the calibration prohibition timer expires and whether the period of the calibration time window is reached.

For example, when the non-periodic trigger condition is configured, if the network device does not configure a calibration prohibition timer for the terminal device, the terminal device determines whether the calibration trigger condition is satisfied based on whether the transmit information of the terminal device satisfies the first condition. If the network device configures a calibration prohibition timer for the terminal device, the terminal device determines whether the calibration trigger condition is satisfied based on whether the calibration prohibition timer expires and whether the transmit information of the terminal device satisfies the first condition. determine whether the calibration trigger condition is satisfied.

In the terminal calibration method provided by embodiments of the present disclosure, the terminal device sends the calibration capability information of the terminal device to the network device, the network device determines the calibration configuration information for the terminal device based on the received calibration capability information, and sends the determined calibration configuration information to the terminal device. The terminal device performs the calibration procedure based on the calibration configuration information. In the technical solutions, the terminal device performs the calibration procedure based on the calibration configuration information from the network device, which improves the quality of the transmit signal(s), improves the reception performance of the terminal device, and solves the problem of interference with other terminals without affecting normal use.

Figure 9:
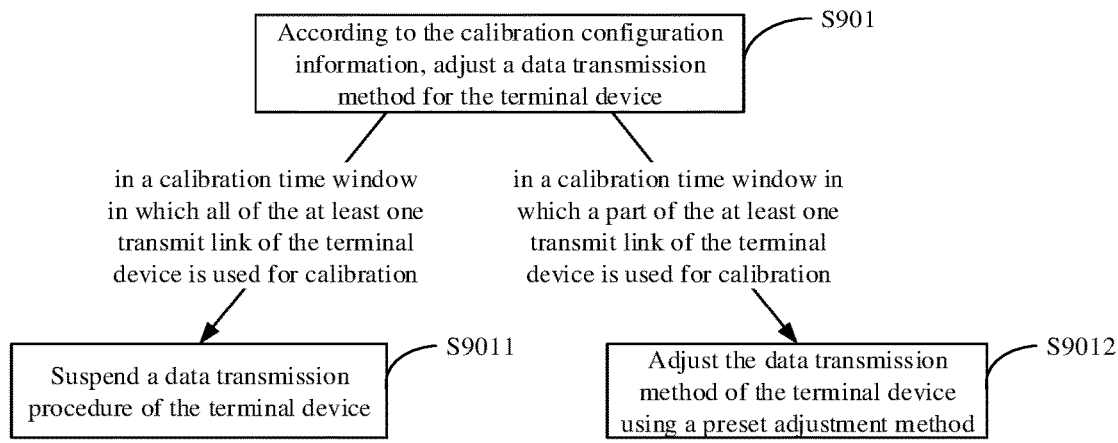
FIG. 9 is a schematic flowchart of a terminal calibration method according to a second embodiment of the present disclosure.

Exemplarily, on the basis of the above embodiments, FIG. 9 is a schematic flowchart of a terminal calibration method according to a second embodiment of the present disclosure. The method is illustrated with the network device as the entity for performing the method. Referring to FIG. 9, during the calibration of the terminal device, the network device may further perform the following step(s).

In S901, according to the calibration configuration information, a data transmission method for the terminal device is adjusted.

Specifically, in this embodiment, since the types of calibration time windows supported by different terminal devices may be different, their works carried out within the calibration time windows are different. In this case, the network device may adjust the data transmission methods of the terminal devices accordingly based on the calibration configuration information configured for the terminal devices. Thus, depending on the type of calibration time window supported by a terminal device, S901 may be implemented specifically in the following manner.

As an example, during the calibration time window in which all of at least one transmit link of the terminal device is used for calibration, S901 is implemented by S9011 as follows.

In S9011, a data transmission procedure of the terminal device is suspended.

For a terminal that supports "a calibration time window fully used for self-calibration", none of the at least one transmit link of the terminal is used for useful signal transmission during the whole calibration procedure, and only the calibration procedure can be performed, and the data transmission procedure can be suspended accordingly. That is, the network device suspends the data transmission procedure of the terminal device in the calibration time window in which all of the at least one transmit link of the terminal device is used for calibration, and continues the data transmission procedure after the calibration procedure is completed.

As another example, in the calibration time window in which a part of the at least one transmit link of the terminal device is used for calibration, S901 is implemented by S9012 as follows.

In S9012, the data transmission method of the terminal device is adjusted using a preset adjustment method.

For a terminal that supports "a calibration time window partially used for self-calibration", only a part of the at least one transmit link of the terminal device cannot be used for transmitting useful signal(s) during the whole calibration procedure, and such part of the at least one transmit link is used for the calibration procedure. That is, in the calibration time window, a part of the at least one transmit link of the terminal device is used for transmitting useful signal(s), and another part of the at least one transmit link is used for the calibration procedure. In this case, the network device can adjust the data transmission method of the terminal device using a preset adjustment method in the calibration time window in which a part of the at least one transmit link of the terminal device is used for calibration, and resume the normal data transmission procedure after the calibration procedure is completed.

Figure 10A:
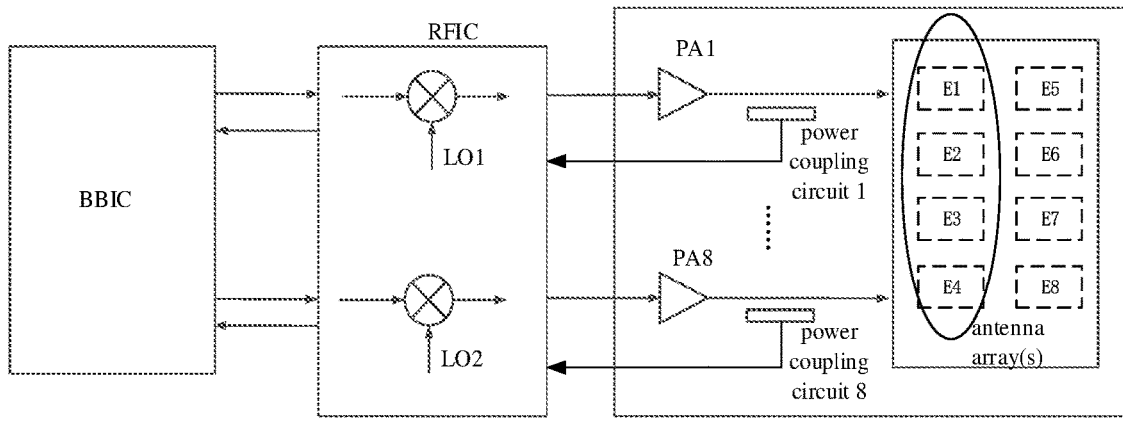
FIG. 10A is a schematic diagram of a distribution of data streams in a millimeter wave terminal.

Exemplarily, FIG. 10A is a schematic diagram of a distribution of data streams in a millimeter wave terminal. As shown in FIG. 10A, the antenna of a millimeter wave terminal includes eight antenna arrays (E1 to E8) corresponding to eight transmit links, and each antenna array is connected to a PA, respectively. Optionally, in practical applications, these eight arrays can be divided into two groups to support dual-stream transmission such as uplink multiple-in multiple-out (UL MIMO). For example, antenna arrays E1 to E4 support one data stream and antenna arrays E5 to E8 support another data stream.

Exemplarily, in the schematic diagram shown in FIG. 10A, the data streams supported by antenna arrays E1 to E4 cannot be transmitted when the terminal device performs the calibration procedure on the transmit links corresponding to E1 to E4 in the calibration time window. At this time, the network device needs to adjust the data stream transmission transmitted on the transmit links corresponding to E1 to E4.

Figure 10B:
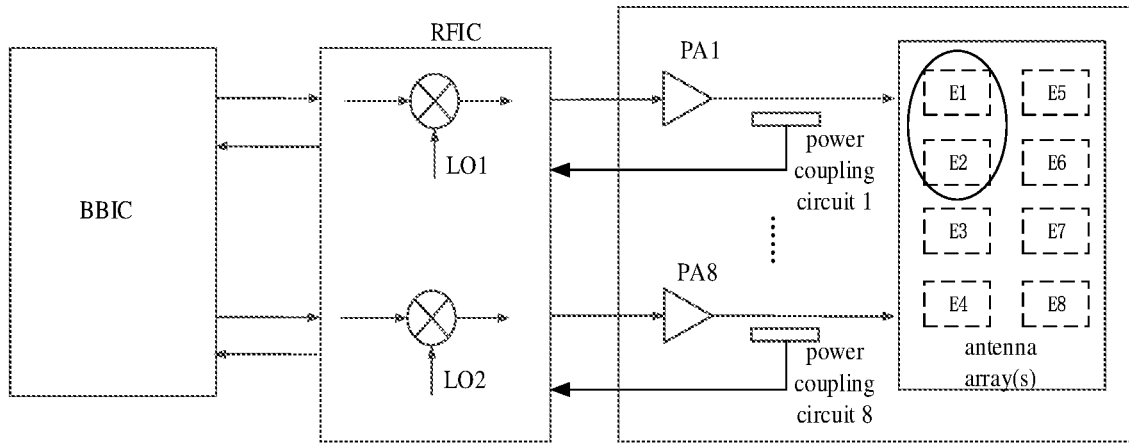
FIG. 10B is a schematic diagram of another distribution of data streams in a millimeter wave terminal.

Exemplarily, FIG. 10B is a schematic diagram of another distribution of data streams in a millimeter wave terminal. FIG. 10B is similar to the radio frequency structure of FIG. 10A. In the schematic diagram shown in FIG. 10B, the terminal device performs calibration on only a part of arrays corresponding to one data stream. For example, the E1 and E2 links among antenna arrays E1 to E4 perform the calibration procedure, while the E3 and E4 links perform normal data transmission. In this case, the data stream can still be transmitted by the E3 and E4 links, and thus there may be some loss of transmission performance of the terminal device. At this time, the network device may choose to adjust the data transmission method of the terminal device or not, which can be determined according to an actual situation.

In practical applications, when the network device adjusts the data transmission method of the terminal device, the network device may decide independently whether to adjust the data transmission method, or the terminal device may decide whether to adjust the data transmission method.

As an example, when the network device adjusts the data transmission method of the terminal device using the preset adjustment method, the network device may specifically determine whether to adjust the data transmission method of the terminal device based on the transmit link information of the terminal device performing the calibration procedure in the calibration time window.

Specifically, for a terminal which supports "a calibration time window partially used for self-calibration", when the network device configures the calibration time window, i.e., in addition to configuring the calibration slot information, the network device may also adjust the data transmission method of the terminal device. For example, in the calibration time window, the network device also adjusts the dual-stream transmission of the terminal device to single-stream transmission, and the network device restores the dual-stream transmission after the calibration.

As another example, when the network device adjusts the data transmission method of the terminal device using the preset adjustment method, it can also specifically determine whether to adjust the data transmission method of the terminal device based on whether it receives a data transmission adjustment request reported by the terminal device.

Specifically, the terminal device may send a data transmission adjustment request (i.e., report a MIMO adjustment request) to the network device in the calibration time window in which a part of the at least one transmit link is used for calibration. Accordingly, the network device may adjust the data transmission method during the calibration of the terminal device based on the received data transmission adjustment request. For example, the network device may adjust the dual-stream transmission of the terminal device in the corresponding calibration time window as single-stream transmission, and restore the dual-stream transmission after the calibration is completed.

Optionally, the terminal device may not send a data transmission adjustment request to the network device. In this case, the network device does not adjust the data transmission method in the corresponding calibration time window.

In the terminal calibration method provided by the embodiments of the present disclosure, when the terminal device performs the calibration procedure under the control of the network device, the network device can adjust the data transmission method before and during and after the calibration procedure, which can further ensure the stability of the data transmission procedure and improve the data transmission quality.

As can be seen from the above embodiments shown in FIG. 6 and FIG. 9, the terminal device performs a periodic or non-periodic calibration procedure based on the calibration configuration information from the network device and adjusts the data stream transmission before and during and after calibration, which improves the transmit signal quality.

However, in a case of a large number of terminal devices in a cell, the complexity in calibration time window configuration and MIMO transmission adjustment for the terminal devices by the network device is high. In view of this, the terminal calibration procedure may also be done under an autonomous control of the terminal device.

Figure 11:
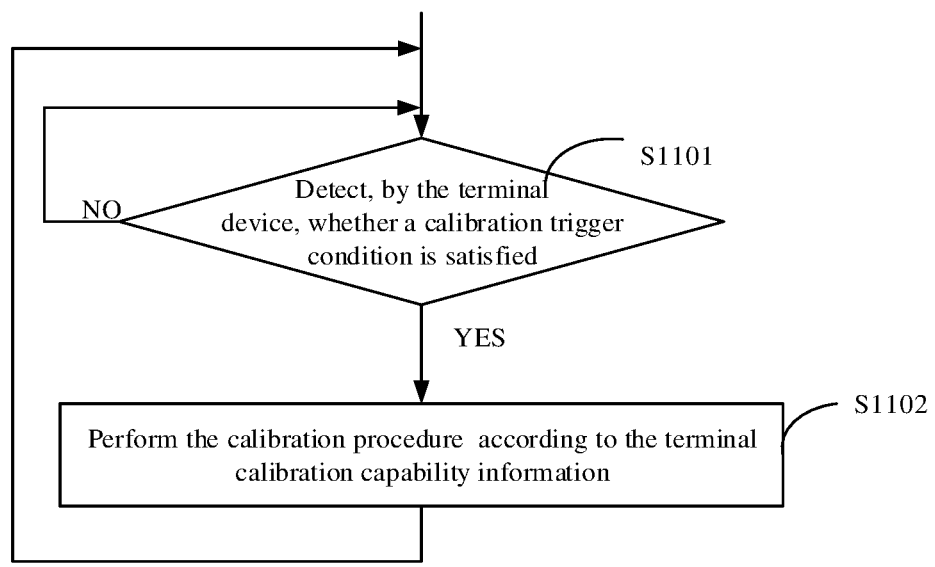
FIG. 11 is a schematic flowchart of a terminal calibration method according to a third embodiment of the present disclosure.

FIG. 11 is a schematic flowchart of a terminal calibration method according to a third embodiment of the present disclosure. The method is illustrated with the terminal device as the entity for performing the method. Referring to FIG. 11, in this embodiment, the method may include the following steps.

In S1101, the terminal device detects whether a calibration trigger condition is satisfied; if the detection result is yes, S1102 is performed; if the detection result is not, the flowchart continues to S1101.

Exemplarily, in practical applications, the terminal device may also determine whether the calibration trigger condition is stratified based on a scenario in which it is or information which the terminal device has. For example, the terminal device does not need to perform the calibration procedure when the transmit power is low; the terminal device needs to perform the calibration procedure when the transmit power is high.

Specifically, the terminal device may determine whether self-calibration is required based on a condition such as transmit power. For example, the calibration trigger condition includes any one of the following that:

a calibration prohibition timer configured by a network device expires and transmit information of a terminal device satisfies a first condition; or the network device does not configure the calibration prohibition timer and the transmit information of the terminal device satisfies the first condition.

In practice applications, if the network device configures a calibration prohibition timer for the calibration procedure of the terminal device, the calibration trigger condition needs to satisfy both of the following two conditions: first, the transmit information of the terminal device satisfies the first condition; and, the calibration prohibition timer expires. If the network device does not configure a calibration prohibition timer for the calibration procedure of the terminal device, the calibration trigger condition is that: the terminal device can be triggered to perform the calibration procedure when the transmit information of the terminal device satisfies the first condition.

Optionally, the first condition includes at least one of the following that:

an amount of change in a transmit power of the terminal device between a current transmit moment and a previous transmit moment is greater than a power change threshold;

the transmit power of the terminal device is greater a power threshold;

an amount of change in a transmit bandwidth of the terminal device between the current transmit moment and the previous transmit moment is greater than a bandwidth change threshold;

the transmit bandwidth of the terminal device is greater than a bandwidth threshold; and a used modulation method satisfies a preset modulation condition.

It will be understood that the explanations regarding the first condition can be found in the description regarding the first condition in the embodiments shown in FIG. 6 above and will not be repeated here.

In an embodiment, when the terminal device detects that the terminal device satisfies the calibration trigger condition, the terminal device may perform the calibration procedure based on its own supported calibration capability information. If the terminal device does not satisfy the calibration trigger condition, the terminal device continues to perform detection until the terminal device detects that the calibration trigger condition is satisfied, and then the terminal device performs the calibration procedure.

In S1102, the calibration procedure is performed according to the terminal calibration capability information.

When it is determined that the calibration trigger condition is satisfied, the terminal device can perform the calibration procedure on a determined transmit link in a suitable calibration time window based on the calibration capability information it supports.

For example, for a calibration time window in which all of at least one transmit link is used for calibration, the terminal device performs the calibration procedure on all of the at least one transmit link in the calibration time window. For a calibration time window in which a part of the at least one transmit link is used for calibration, the terminal device performs the calibration procedure on only a part of the at least one transmit link in the calibration time window. The specific information about the calibration procedure performed by the terminal device may be determined according to an actual scenario and is not repeated here.

Optionally, the calibration capability information of the terminal device includes:
the type of a calibration time window supported by the terminal device;
or, information of at least one terminal performance indicator that the terminal device is capable of adjusting after calibration;
or, both the type of a calibration time window supported by the terminal device and information of at least one terminal performance indicator that the terminal device is capable of adjusting after calibration.

The type of calibration time window supported by the terminal device includes:
a calibration time window in which all of at least one transmit link is used for calibration;
or a calibration time window in which a part of the at least one transmit link is used for calibration;
or, both the calibration time window in which all of at least one transmit link is used for calibration and the calibration time window in which a part of the at least one transmit link is used for calibration.

Descriptions regarding the calibration capability information can be found in the above descriptions regarding S601 in the embodiments shown in FIG. 6 and will not be repeated here.

It will be understood that the terminal device, after performing this calibration procedure, may also return to continue performing S1101 to continue to detect whether the calibration procedure can be performed.

In the terminal calibration method provided by the embodiments of the present disclosure, the terminal device detects whether the calibration trigger condition is satisfied, and performs the calibration procedure based on the terminal calibration capability information when the calibration trigger condition is determined to be satisfied. In the technical solutions, the terminal carries out the calibration procedure based on its own condition(s), i.e., the calibration procedure does not need the participation of the network device, the terminal device decides autonomously in which time windows to perform the calibration procedure. The technical solutions are simpler and can also improve the quality of the transmit signal(s) to a certain extent, but there may be problems of missed detection of important information and increased BER (Bit Error Rate).

Figure 12:
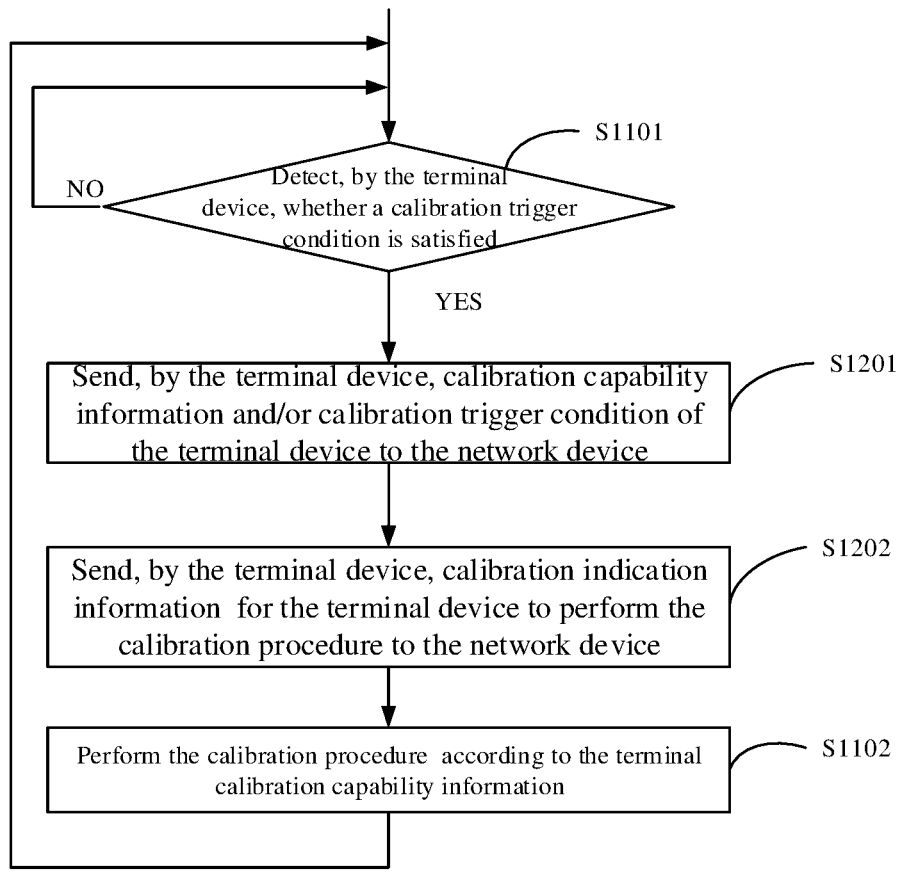
FIG. 12 is a schematic flowchart of a terminal calibration method according to a fourth embodiment of the present disclosure.

Based on the above embodiments, FIG. 12 is a schematic flowchart of a terminal calibration method according to a fourth embodiment of the present disclosure. Referring to FIG. 12, the method may further include the following steps.

In S1201, the terminal device sends calibration capability information and/or calibration trigger condition of the terminal device to the network device.

Optionally, in the embodiment of the present disclosure, when the terminal device determines that the calibration trigger condition is satisfied by detecting the transmit information (e.g., the magnitude of the transmit power, the magnitude of the transmit bandwidth, the modulation method, etc.), in order to enable the network device to timely determine the calibration time window(s) and/or transmit link information for the terminal device to perform the calibration procedure, the terminal device may also send the calibration capability information and/or calibration trigger condition of the terminal device to the network device.

It is understood that the execution of S1201 may be before S1101, i.e., before detecting whether the calibration trigger condition is satisfied, or may be after S1101, i.e., when it is determined that the calibration trigger condition is satisfied. Embodiments of the present disclosure do not limit the execution time of S1201, which may be determined according to an actual scenario.

The specific explanations regarding the calibration capability information and the calibration trigger condition can be found in the embodiments shown in FIG. 11 above and will not be repeated here.

Exemplarily, in the embodiment shown in FIG. 12, the terminal device may further perform the following steps when the terminal device determines that the calibration trigger condition is satisfied.

In S1202, the terminal device sends calibration indication information for the terminal device to perform the calibration procedure to the network device.

In this embodiment, upon determining that the calibration trigger condition is satisfied, the terminal device may also send calibration indication information for the terminal device to perform the calibration procedure to the network device before the calibration procedure is performed and/or during execution of the calibration procedure, to notify the network device in time that the calibration procedure is about to be performed and/or is being performed, so that the network device can adjust the data transmission method during the calibration procedure, etc.

Usually, the terminal device may first send this calibration indication information to the network device before executing the calibration procedure, so that the network device can adjust the data reception strategy in a timely manner. Accordingly, this can solve the problem of missed detection of data for important information or increase of BER to a certain extent. This technical solution can not only realize the real-time calibration of the terminal device during the transmission procedure, but also improves region for linear transmit power for the terminal device and increases the magnitude of the transmit power.

In summary, in the terminal calibration method provided by the embodiments of the present disclosure, the terminal device can either perform the calibration procedure under the control of the network device or perform the calibration procedure on its own initiative, both of which can reduce the probability of distortion of the transmit signal(s) of the terminal device, improve the quality of the transmit signal(s) and reception performance, and avoid the problem of interference with other users.

The above describes the example implementations of the terminal calibration methods mentioned in the embodiments of the present disclosure, and the following describes devices of the present disclosure that can be used to perform the method embodiments of the present disclosure. For details not disclosed in the device embodiments of the present disclosure, reference can be made to the above descriptions regarding the method embodiments of the present disclosure.

Figure 13:
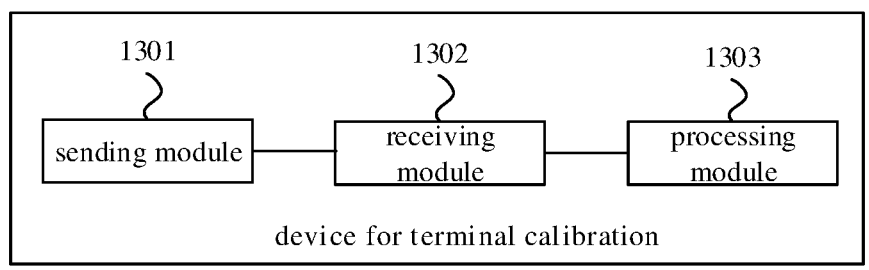
FIG. 13 is a schematic diagram of the structure of a device for terminal calibration according to a first embodiment of the present disclosure.

FIG. 13 is a schematic diagram of the structure of a device for terminal calibration according to a first embodiment of the present disclosure. The device may be integrated in a terminal device, or may be implemented by the terminal device. As shown in FIG. 13, the device for terminal calibration may include a sending module 1301, a receiving module 1302 and a processing module 1303.

The sending module 1301 is configured to send to a network device calibration capability information of a terminal device.

The receiving module 1302 is configured to receive calibration configuration information which is determined by the network device based on the calibration capability information.

The processing module 1303 is configured to perform a calibration procedure according to the calibration configuration information.

In an embodiment of the present disclosure, the calibration capability information includes at least one of:
  a type of a calibration time window supported by the terminal device;
  information of at least one terminal performance indicator that the terminal device is capable of adjusting after calibration; and
  a calibration type supported by the terminal device.

Optionally, the type of the calibration time window supported by the terminal device includes at least one of:
  a calibration time window in which all of at least one transmit link is used for calibration; and
  a calibration time window in which a part of the at least one transmit link is used for calibration.

Optionally, the calibration type supported by the terminal device includes at least one of:
  a periodic calibration, and a non-periodic calibration.

In an embodiment of the present disclosure, the calibration configuration information includes at least one of: calibration slot information, and calibration trigger information;
  wherein the calibration slot information includes at least one of: a length, a period and a start position of a calibration time window;
  wherein the calibration trigger information includes at least one of: a periodic trigger condition, and a non-periodic trigger condition.

Optionally, the periodic trigger condition includes any one of the following that:
  a calibration prohibition timer configured by the network device expires and a calibration period configured by the network device is reached; or
  the network device does not configure the calibration prohibition timer and the calibration period configured by the network device is reached.

Optionally, the non-periodic trigger condition includes any one of the following that:

a calibration prohibition timer configured by the network device expires and transmit information of the terminal device satisfies a first condition; or
  the network device does not configure the calibration prohibition timer and the transmit information of the terminal device satisfies the first condition.

The first condition includes at least one of the following that:
  an amount of change in a transmit power of the terminal device between a current transmit moment and a previous transmit moment is greater than a power change threshold;
  the transmit power of the terminal device is greater a power threshold;
  an amount of change in a transmit bandwidth of the terminal device between the current transmit moment and the previous transmit moment is greater than a bandwidth change threshold;
  the transmit bandwidth of the terminal device is greater than a bandwidth threshold; and
  a used modulation method satisfies a preset modulation condition.

In a possible design of an embodiment of the present disclosure, the processing module 1303 is configured to:
  according to the calibration trigger information, determine that a calibration trigger condition is satisfied; and
  perform the calibration procedure according to the calibration slot information.

In another possible design of an embodiment of the present disclosure, the sending module 1301 is further configured to:
  send a data transmission adjustment request to the network device in a calibration time window in which a part of at least one transmit link is used for calibration, wherein the data transmission adjustment request is used to request the network device to adjust a data transmission method during the calibration procedure of the terminal device.

The device for terminal calibration provided in the embodiments is used to perform the technical solutions on the terminal device side in the method embodiments described in FIG. 6 and FIG. 9, the device embodiments and method embodiments are similar in principle of implementation and technical effects and repeated descriptions will be omitted here.

Figure 14:
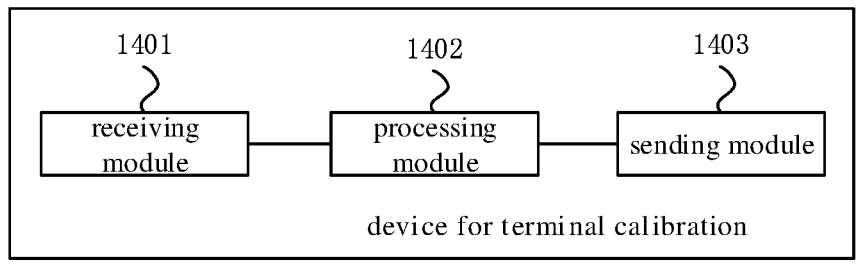
FIG. 14 is a schematic diagram of the structure of a device for terminal calibration according to a second embodiment of the present disclosure.

FIG. 14 is a schematic diagram of the structure of a device for terminal calibration according to a second embodiment of the present disclosure. The device may be integrated in a network device, or may be implemented by a network device. As shown in FIG. 14, the device for terminal calibration may include a receiving module 1401, a processing module 1402 and a sending module 1403.

The receiving module 1401 is configured to receive calibration capability information from a terminal device.

The processing module 1402 is configured to, according to the calibration capability information, determine calibration configuration information for the terminal device.

The sending module 1403 is configured to send the calibration configuration information to the terminal device.

In an embodiment of the present disclosure, the calibration capability information includes at least one of:
  a type of a calibration time window supported by the terminal device;
  information of at least one terminal performance indicator that the terminal device is capable of adjusting after calibration; and
  a calibration type supported by the terminal device.

Optionally, the type of the calibration time window supported by the terminal device includes at least one of:
a calibration time window in which all of at least one transmit link is used for calibration; and
a calibration time window in which a part of the at least one transmit link is used for calibration.

Optionally, the calibration type supported by the terminal device includes at least one of:
a periodic calibration, and a non-periodic calibration.

In an embodiment of the present disclosure, the calibration configuration information includes at least one of: calibration slot information, and calibration trigger information;
wherein the calibration slot information includes at least one of: a length, a period and a start position of a calibration time window;
wherein the calibration trigger information includes at least one of: a periodic trigger condition, and a non-periodic trigger condition.

Optionally, the periodic trigger condition includes any one of the following that:
a calibration prohibition timer configured by the network device expires and a calibration period configured by the network device is reached; or
the network device does not configure the calibration prohibition timer and the calibration period configured by the network device is reached.

Optionally, the non-periodic trigger condition includes any one of the following that:
a calibration prohibition timer configured by the network device expires and transmit information of the terminal device satisfies a first condition; or
the network device does not configure the calibration prohibition timer and the transmit information of the terminal device satisfies the first condition.

The first condition includes at least one of the following that:
an amount of change in a transmit power of the terminal device between a current transmit moment and a previous transmit moment is greater than a power change threshold;
the transmit power of the terminal device is greater a power threshold;
an amount of change in a transmit bandwidth of the terminal device between the current transmit moment and the previous transmit moment is greater than a bandwidth change threshold;
the transmit bandwidth of the terminal device is greater than a bandwidth threshold; and
a used modulation method satisfies a preset modulation condition.

In a possible design of an embodiment of the present disclosure, the processing module 1402 is further configured to:
during a calibration procedure of the terminal device, adjust a data transmission method for the terminal device according to the calibration configuration information.

Optionally, adjusting by the processing module 1402 the data transmission method for the terminal device according to the calibration configuration information, includes:
the processing module 1402 being configured to:
suspend a data transmission procedure of the terminal device in a calibration time window in which all of at least one transmit link of the terminal device is used for calibration; and
adjust the data transmission method for the terminal device using a preset adjustment method in a calibration time window in which a part of the at least one transmit link of the terminal device is used for calibration.

As an example, adjusting by the processing module 1402 the data transmission method for the terminal device using the preset adjustment method, includes:
the processing module 1402 being configured to:
determine whether to adjust the data transmission method for the terminal device according to transmit link information for the terminal device to perform the calibration procedure in a calibration time window.

As another example, adjusting by the processing module 1402 the data transmission method for the terminal device using the preset adjustment method, includes:
the processing module 1402 being configured to:
determine whether to adjust the data transmission method for the terminal device according to whether a data transmission adjustment request reported by the terminal device is received.

The device for terminal calibration provided in the embodiments is used to perform the technical solutions on the network device side in the method embodiments described in FIG. 6 and FIG. 9, the device embodiments and method embodiments are similar in principle of implementation and technical effects and repeated descriptions will be omitted here.

Figure 15:
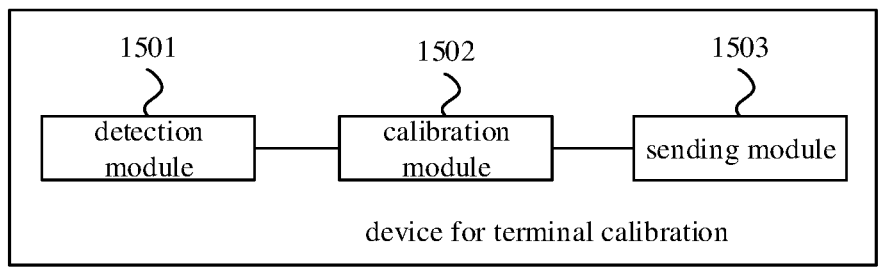
FIG. 15 is a schematic diagram of the structure of a device for terminal calibration according to a third embodiment of the present disclosure.

FIG. 15 is a schematic diagram of the structure of a device for terminal calibration according to a third embodiment of the present disclosure. The device may be integrated in a terminal device, or may be implemented by a terminal device. As shown in FIG. 15, the device for terminal calibration may include a detection module 1501 and a calibration module 1502.

The detection module 1501 is configured to detect whether a calibration trigger condition is satisfied.

The calibration module 1502 is configured to perform a calibration procedure according to terminal calibration capability information when it is determined that the calibration trigger condition is satisfied.

In a possible design of an embodiment of the present disclosure, the device further includes a sending module 1503.

The sending module 1503 is configured to:
send the calibration trigger condition and/or the calibration capability information of a terminal device to a network device; and/or
send to the network device calibration indication information for the terminal device to perform the calibration procedure when it is determined that the calibration trigger condition is satisfied.

Optionally, the calibration capability information includes at least one of:
a type of a calibration time window supported by the terminal device; and
information of at least one terminal performance indicator that the terminal device is capable of adjusting after calibration.

The type of the calibration time window supported by the terminal device includes at least one of:
a calibration time window in which all of at least one transmit link is used for calibration; and
a calibration time window in which a part of the at least one transmit link is used for calibration.

Optionally, in an embodiment of the present disclosure, the calibration trigger condition includes any one of the following that:
    a calibration prohibition timer configured by a network device expires and transmit information of a terminal device satisfies a first condition; or
    the network device does not configure the calibration prohibition timer and the transmit information of the terminal device satisfies the first condition.

The first condition includes at least one of the following that:
    an amount of change in a transmit power of the terminal device between a current transmit moment and a previous transmit moment is greater than a power change threshold;
    the transmit power of the terminal device is greater a power threshold;
    an amount of change in a transmit bandwidth of the terminal device between the current transmit moment and the previous transmit moment is greater than a bandwidth change threshold;
    the transmit bandwidth of the terminal device is greater than a bandwidth threshold; and
    a used modulation method satisfies a preset modulation condition.

The device for terminal calibration provided in the embodiments is used to perform the technical solutions on the terminal device side in the method embodiments described in FIG. 11 and FIG. 12, the device embodiments and method embodiments are similar in principle of implementation and technical effects and repeated descriptions will be omitted here.

Figure 16:
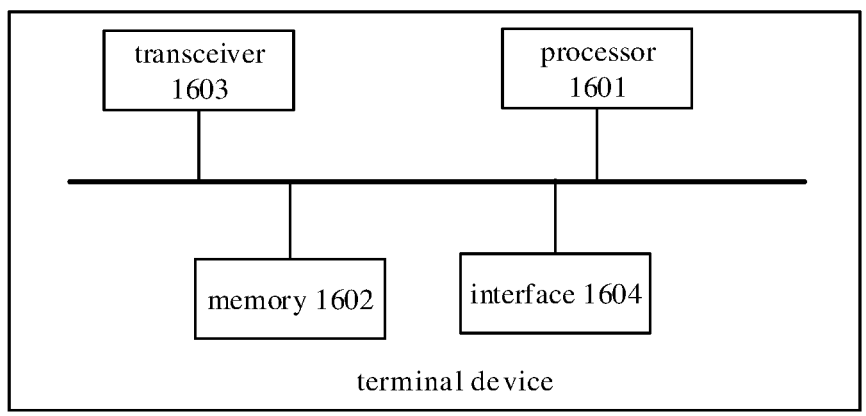
FIG. 16 is a schematic diagram of the structure of a terminal device according to a first embodiment of the present disclosure.

FIG. 16 is a schematic diagram of a structure of a terminal device according to a first embodiment of the present disclosure. As shown in FIG. 16, the terminal device may include: a processor 1601, a memory 1602, a transceiver 1603, and an interface 1604 for communication with a network device.

The memory 1602 stores computer executable instructions.

The processor 1601 executes the computer executable instructions stored in the memory 1602, so that the processor 1601 performs the technical solutions on the terminal device side in the foregoing method embodiments as shown in FIG. 6 and FIG. 9.

Figure 17:
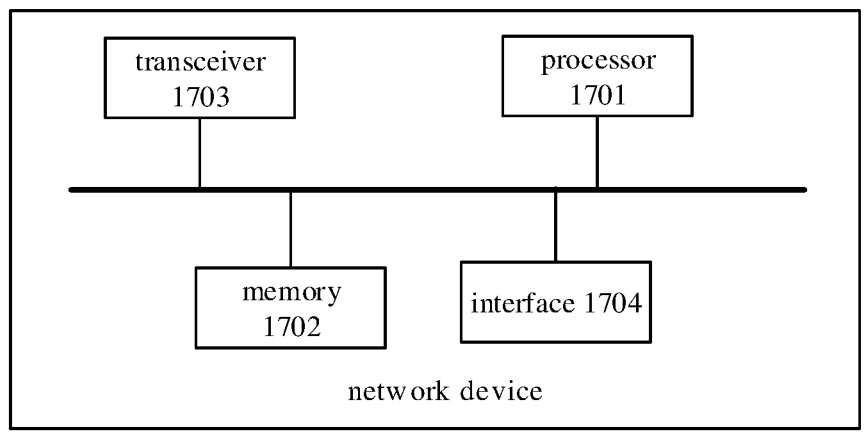
FIG. 17 is a schematic diagram of the structure of a network device according to a first embodiment of the present disclosure.

FIG. 17 is a schematic diagram of a structure of a network device according to a first embodiment of the present disclosure. As shown in FIG. 17, the network device may include: a processor 1701, a memory 1702, a transceiver 1703, and an interface 1704 for communication with the terminal device.

The memory 1702 stores computer executable instructions.

The processor 1701 executes the computer executable instructions stored in the memory 1702, so that the processor 1701 performs the technical solutions on the network device side in the foregoing method embodiments as shown in FIG. 6 and FIG. 9.

Figure 18:
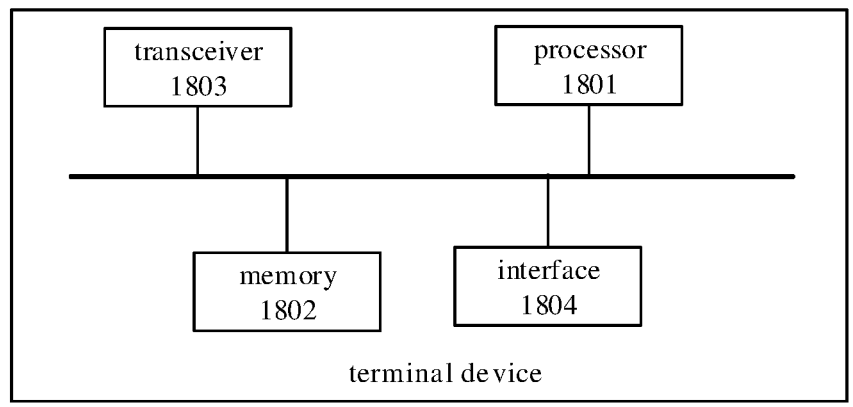
FIG. 18 is a schematic diagram of the structure of a terminal device according to a second embodiment of the present disclosure.

FIG. 18 is a schematic diagram of a structure of a terminal device according to a second embodiment of the present disclosure. As shown in FIG. 18, the terminal device may include: a processor 1801, and a memory 1802. Optionally, the terminal device may further include a transceiver 1803 and an interface 1804 for communication with a network device.

The memory 1802 stores computer executable instructions.

The processor 1801 executes the computer executable instructions stored in the memory 1802, so that the processor 1801 performs the technical solutions on the terminal device side in the foregoing method embodiments as shown in FIG. 11 and FIG. 12.

Further, an embodiment of the present disclosure may also provide a communication system, which may include: a terminal device and a network device.

The terminal device may include the terminal device described in FIG. 13 and/or FIG. 15, and the network device may include the network device described in FIG. 14.

It is understood that the communication system may further include other device(s), which may be determined based on actual scenarios and are not described herein.

An embodiment of the present disclosure further provides a computer-readable storage medium having computer executable instructions stored thereon, wherein when the computer executable instructions are executed by a processor, the processor is caused to perform technical solutions on the terminal device side in the above method embodiments as shown in FIG. 6 and FIG. 9.

An embodiment of the present disclosure further provides a computer-readable storage medium having computer executable instructions stored thereon, wherein when the computer executable instructions are executed by a processor, the processor is caused to perform technical solutions on the network device side in the above method embodiments as shown in FIG. 6 and FIG. 9.

An embodiment of the present disclosure further provides a computer-readable storage medium having computer executable instructions stored thereon, wherein when the computer executable instructions are executed by a processor, the processor is caused to perform technical solutions on the terminal device side in the above method embodiments as shown in FIG. 11 and FIG. 12.

An embodiment of the present disclosure further provides a program. When the program is executed by a processor, the processor is caused to perform technical solutions on the terminal device side in the above method embodiments as shown in FIG. 6 and FIG. 9.

An embodiment of the present disclosure further provides a program. When the program is executed by a processor, the processor is caused to perform technical solutions on the network device side in the above method embodiments as shown in FIG. 6 and FIG. 9.

An embodiment of the present disclosure further provides a program. When the program is executed by a processor, the processor is caused to perform technical solutions on the terminal device side in the above method embodiments as shown in FIG. 11 and FIG. 12.

An embodiment of the present disclosure further provides a computer program product including program instructions for implementing the technical solutions on the terminal device side in the above method embodiments as shown in FIG. 6 and FIG. 9.

An embodiment of the present disclosure further provides a computer program product including program instructions for implementing the technical solutions on the network device side in the above method embodiments as shown in FIG. 6 and FIG. 9.

An embodiment of the present disclosure further provides a computer program product including program instructions for implementing the technical solutions on the terminal device side in the above method embodiments as shown in FIG. 11 and FIG. 12.

An embodiment of the present disclosure further provides a chip including: a processing module and a communication interface. The processing module is configured to implement the technical solutions on the terminal device side in the above method embodiments as shown in FIG. 6 and FIG. 9.

Further, the chip includes a storage module (e.g., memory). The storage module is used to store instructions, the processing module is used to execute the instructions stored in the storage module, and execution of the instructions stored in the storage module causes the processing module to execute the technical solutions on the terminal device side in the above method embodiments as shown in FIG. 6 and FIG. 9.

An embodiment of the present disclosure further provides a chip including: a processing module and a communication interface. The processing module is configured to implement the technical solutions on the network device side in the above method embodiments as shown in FIG. 6 and FIG. 9.

Further, the chip includes a storage module (e.g., memory). The storage module is used to store instructions, the processing module is used to execute the instructions stored in the storage module, and execution of the instructions stored in the storage module causes the processing module to execute the technical solutions on the network device side in the above method embodiments as shown in FIG. 6 and FIG. 9.

An embodiment of the present disclosure further provides a chip including: a processing module and a communication interface. The processing module is configured to implement the technical solutions on the terminal device side in the above method embodiments as shown in FIG. 11 and FIG. 12.

Further, the chip includes a storage module (e.g., memory). The storage module is used to store instructions, the processing module is used to execute the instructions stored in the storage module, and execution of the instructions stored in the storage module causes the processing module to execute the technical solutions on the terminal device side in the above method embodiments as shown in FIG. 11 and FIG. 12.

In embodiments of the present disclosure, it should be understood that the disclosed systems, apparatuses, and methods may be implemented in other ways. For example, the device embodiments described above are merely schematic. For example, the division of the units described herein is only a logical functional division, and the units may be divided in another way in actual implementations. For example, multiple units or components maybe combined or can be integrated into another system, or some features may be ignored, or not implemented. On another point, the mutual coupling or direct coupling or communication connection shown or discussed may be indirect coupling or communication connection through some interface(s), device(s) or unit(s), which may be electrical, mechanical or other forms.

In the above example implementations of the network device and terminal device, it should be understood that the processor may be a Central Processing Unit (CPU), or may be other general purpose processor, Digital Signal Processor (DSP), Application Specific Integrated Circuit (ASIC), etc. The general-purpose processor may be a microprocessor or the processor may also be any conventional processor, etc. The steps in the methods of embodiments of the present disclosure may be directly embodied as being implemented by a hardware processor, or may be implemented by a combination of hardware and software modules in the processor.

All or some of the steps of each of the method embodiments described above may be implemented by program instructions related hardware associated with program instructions. The aforementioned program may be stored in a readable memory. The program, when executed, performs the steps including each of the method embodiments described above. The aforementioned memory (storage medium) includes: a Read-Only Memory (ROM), RAM, a flash memory, a hard disk, a solid state drive, a magnetic tape, a floppy disk, an optical disc and any combination thereof.

What is claimed is:

1. A terminal calibration method, comprising:
sending to a network device calibration capability information of a terminal device;
receiving calibration configuration information which is determined by the network device based on the calibration capability information; and
performing a calibration procedure according to the calibration configuration information;
wherein the calibration capability information comprises at least one of:
a type of a calibration time window supported by the terminal device;
information of at least one terminal performance indicator that the terminal device is capable of adjusting after calibration; or
a calibration type supported by the terminal device.

2. The method according to claim 1, wherein the calibration type supported by the terminal device comprises at least one of:
a periodic calibration, or a non-periodic calibration.

3. The method according to claim 1, wherein the calibration configuration information comprises at least one of: calibration slot information, or calibration trigger information;
wherein the calibration slot information comprises at least one of: a length, a period and a start position of a calibration time window;
wherein the calibration trigger information comprises at least one of: a periodic trigger condition, and a non-periodic trigger condition.

4. The method according to claim 3, wherein the periodic trigger condition comprises any one of the following that:
a calibration prohibition timer configured by the network device expires and a calibration period configured by the network device is reached; or
the network device does not configure the calibration prohibition timer and the calibration period configured by the network device is reached.

5. The method according to claim 3, wherein the non-periodic trigger condition comprises any one of the following that:
a calibration prohibition timer configured by the network device expires and transmit information of the terminal device satisfies a first condition; or
the network device does not configure the calibration prohibition timer and the transmit information of the terminal device satisfies the first condition.

6. The method according to claim 1, further comprising:
sending a data transmission adjustment request to the network device in a calibration time window in which a part of at least one transmit link is used for calibration, wherein the data transmission adjustment request is used to request the network device to adjust a data transmission method during the calibration procedure of the terminal device.

7. A terminal device, comprising:
a processor; and a memory storing instructions executable by the processor;
wherein when the instructions are executed by the processor, the terminal device is caused to:
send to a network device calibration capability information of a terminal device;
receive calibration configuration information which is determined by the network device based on the calibration capability information; and
perform a calibration procedure according to the calibration configuration information;
wherein the calibration capability information comprises at least one of:
a type of a calibration time window supported by the terminal device;
information of at least one terminal performance indicator that the terminal device is capable of adjusting after calibration; or
a calibration type supported by the terminal device.

8. The terminal device according to claim 7, wherein the calibration type supported by the terminal device comprises at least one of:
a periodic calibration, or a non-periodic calibration.

9. The terminal device according to claim 7, wherein the calibration configuration information comprises at least one of: calibration slot information, or calibration trigger information;
wherein the calibration slot information comprises at least one of: a length, a period and a start position of a calibration time window;
wherein the calibration trigger information comprises at least one of: a periodic trigger condition, and a non-periodic trigger condition.

10. The terminal device according to claim 9, wherein the periodic trigger condition comprises any one of the following that:
a calibration prohibition timer configured by the network device expires and a calibration period configured by the network device is reached; or
the network device does not configure the calibration prohibition timer and the calibration period configured by the network device is reached.

11. The terminal device according to claim 9, wherein the non-periodic trigger condition comprises any one of the following that:
a calibration prohibition timer configured by the network device expires and transmit information of the terminal device satisfies a first condition; or
the network device does not configure the calibration prohibition timer and the transmit information of the terminal device satisfies the first condition.

12. The terminal device according to claim 7, wherein when the instructions are executed by the processor, the terminal device is caused to:
send a data transmission adjustment request to the network device in a calibration time window in which a part of at least one transmit link is used for calibration, wherein the data transmission adjustment request is used to request the network device to adjust a data transmission method during the calibration procedure of the terminal device.

13. A network device, comprising:
a processor; and
a memory storing instructions executable by the processor;
wherein when the instructions are executed by the processor, the terminal device is caused to:
receive calibration capability information from a terminal device;
according to the calibration capability information, determine calibration configuration information for the terminal device; and
send the calibration configuration information to the terminal device;
wherein the calibration capability information comprises at least one of:
a type of a calibration time window supported by the terminal device;
information of at least one terminal performance indicator that the terminal device is capable of adjusting after calibration; or
a calibration type supported by the terminal device.

14. The network device according to claim 13, wherein the calibration configuration information comprises at least one of: calibration slot information, or calibration trigger information;
wherein the calibration slot information comprises at least one of: a length, a period and a start position of a calibration time window;
wherein the calibration trigger information comprises at least one of: a periodic trigger condition, and a non-periodic trigger condition.

15. The network device according to claim 14, wherein the periodic trigger condition comprises any one of the following that:
a calibration prohibition timer configured by the network device expires and a calibration period configured by the network device is reached; or
the network device does not configure the calibration prohibition timer and the calibration period configured by the network device is reached.

16. The network device according to claim 14, wherein the non-periodic trigger condition comprises any one of the following that:
a calibration prohibition timer configured by the network device expires and transmit information of the terminal device satisfies a first condition; or
the network device does not configure the calibration prohibition timer and the transmit information of the terminal device satisfies the first condition.

17. The network device according to claim 13, wherein when the instructions are executed by the processor, the network device is caused to:
adjust a data transmission method for the terminal device according to the calibration configuration information during a calibration procedure of the terminal;
wherein adjusting the data transmission method for the terminal device, comprises:
suspending a data transmission procedure of the terminal device in a calibration time window in which all of at least one transmit link of the terminal device is used for calibration; and/or
adjusting the data transmission method for the terminal device using a preset adjustment method in a calibration time window in which a part of the at least one transmit link of the terminal device is used for calibration;
wherein adjusting the data transmission method for the terminal device using the preset adjustment method, comprises:
determining whether to adjust the data transmission method for the terminal device according to whether a data transmission adjustment request reported by the terminal device is received.

\* \* \* \* \*